United States Patent
Gormley

(10) Patent No.: US 11,719,190 B2
(45) Date of Patent: Aug. 8, 2023

(54) THRUST REVERSER SYSTEM WITH HIDDEN TURNING DOOR

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/494,265

(22) Filed: Oct. 5, 2021

(65) Prior Publication Data

US 2023/0106521 A1   Apr. 6, 2023

(51) Int. Cl.
- *F02K 1/72* (2006.01)
- *F02K 1/76* (2006.01)
- *F02K 1/70* (2006.01)

(52) U.S. Cl.
CPC ............ *F02K 1/72* (2013.01); *F02K 1/70* (2013.01); *F02K 1/763* (2013.01); *F05D 2220/323* (2013.01)

(58) Field of Classification Search
CPC ... F02K 1/70; F02K 1/72; F02K 1/763; F05D 2220/323
See application file for complete search history.

(56) References Cited

U.S. PATENT DOCUMENTS

| | | | |
|---|---|---|---|
| 3,690,561 A | | 9/1972 | Potter |
| 3,815,357 A | * | 6/1974 | Brennan .................. F02K 1/70 244/76 B |
| 7,264,203 B2 | | 9/2007 | Lair |
| 7,874,142 B2 | | 1/2011 | Beardsley |
| 8,904,751 B2 | | 12/2014 | Howarth |
| 9,482,181 B2 | | 11/2016 | Hurlin |
| 9,784,214 B2 | | 10/2017 | Gormley |
| 10,041,443 B2 | | 8/2018 | Foutch |
| 10,208,708 B2 | | 2/2019 | Gormley |
| 10,302,044 B2 | | 5/2019 | Schrell |
| 10,533,519 B2 | | 1/2020 | Gormley |
| 10,563,615 B2 | | 2/2020 | Howarth |
| 10,837,404 B2 | | 11/2020 | Aziz |
| 2014/0110503 A1 | * | 4/2014 | Teulou ................ F02K 1/625 239/265.19 |
| 2016/0153399 A1 | | 6/2016 | Sawyers-Abbott |
| 2016/0169157 A1 | | 6/2016 | Sawyers-Abbott |
| 2016/0363097 A1 | * | 12/2016 | Foutch ................ F02K 1/763 |
| 2017/0226962 A1 | | 8/2017 | Crawford |
| 2017/0328304 A1 | | 11/2017 | Gormley |
| 2019/0017469 A1 | | 1/2019 | Morgan |

(Continued)

OTHER PUBLICATIONS

Search report for EP22199897.4 dated Jun. 7, 2023.

*Primary Examiner* — Andrew H Nguyen
(74) *Attorney, Agent, or Firm* — Getz Balich LLC

(57) ABSTRACT

An assembly is provided for an aircraft propulsion system. This assembly includes a thrust reverser system. The thrust reverser system includes a cavity, a sleeve and a turning door. The sleeve is configured to translate along a centerline between a sleeve stowed position and a sleeve deployed position. The turning door is configured to move between a turning door stowed position and a turning door deployed position. The turning door is disposed within the cavity when the sleeve is disposed in the sleeve stowed position. The turning door projects in a radial outward direction away from the sleeve and the centerline when the sleeve is in the sleeve deployed position.

14 Claims, 7 Drawing Sheets

(56) References Cited

U.S. PATENT DOCUMENTS

2019/0032600 A1   1/2019  Beasman
2020/0003154 A1   1/2020  Carr
2020/0018258 A1   1/2020  Aziz
2020/0080513 A1*  3/2020  Presseq .................... F02K 1/72

* cited by examiner

THRUST REVERSER SYSTEM WITH HIDDEN TURNING DOOR

BACKGROUND

1. Technical Field

This disclosure relates generally to an aircraft propulsion system and, more particularly, to a thrust reverser system for the aircraft propulsion system.

2. Background Information

A propulsion system for an aircraft may include a thrust reverser system for providing reverse thrust. Various types and configurations of thrust reverser systems are known in the art. While these known thrust reverser systems have various advantages, there is still room in the art for an improved thrust reverser system.

SUMMARY OF THE DISCLOSURE

According to an aspect of the present disclosure, an assembly is provided for an aircraft propulsion system. This assembly includes a thrust reverser system. The thrust reverser system includes a cavity, a sleeve and a turning door. The sleeve is configured to translate along a centerline between a sleeve stowed position and a sleeve deployed position. The turning door is configured to move between a turning door stowed position and a turning door deployed position. The turning door is disposed within the cavity when the sleeve is disposed in the sleeve stowed position. The turning door projects in a radial outward direction away from the sleeve and the centerline when the sleeve is in the sleeve deployed position.

According to another aspect of the present disclosure, another assembly is provided for an aircraft propulsion system. This assembly includes a thrust reverser system. The thrust reverser system includes a turning door, a blocker door and a linkage. The turning door is configured to pivot radially outward away from a centerline from a turning door stowed position to a turning door deployed position. The turning door includes a turning door panel and a turning door mount that is radially outboard of the turning door panel when the turning door is in the turning door stowed position. The blocker door is configured to pivot radially inward towards the centerline from a blocker door stowed position to a blocker door deployed position. The blocker door includes a blocker door panel and a blocker door mount that is radially outboard of the blocker door panel when the blocker door is in the blocker door stowed position. The linkage is coupled to the turning door mount and the blocker door mount.

According to still another aspect of the present disclosure, another assembly is provided for an aircraft propulsion system. This assembly includes an inner fixed structure and a thrust reverser system. The inner fixed structure at least partially forms an inner peripheral boundary of a bypass flowpath within the aircraft propulsion system. The thrust reverser system includes a sleeve, a turning door, a blocker door, a first linkage and a second linkage. The turning door is stowed when the sleeve is in a sleeve stowed position. The turning door is deployed and projects in a radial outward direction away from the sleeve and a centerline when the sleeve is in a sleeve deployed position. The blocker door is stowed when the sleeve is in the sleeve stowed position. The blocker door and the sleeve at least partially form an inner peripheral boundary of the bypass flowpath when the sleeve is in the sleeve stowed position. The blocker door is deployed and projects in a radial inward direction away from the sleeve and towards the centerline when the sleeve is in the sleeve deployed position. The first linkage is pivotally connected to the turning door and the blocker door. The second linkage is pivotally connected to the blocker door and the inner fixed structure.

The turning door may be disposed within an internal cavity of the thrust reverser system when the sleeve is disposed in the sleeve stowed position.

The linkage may be configured as a strut. The strut may be pivotally connected to the turning door mount and the blocker door mount.

The thrust reverser system may also include a sleeve. The turning door and the blocker door may be movably coupled to the sleeve.

The thrust reverser system may also include a cavity and a sleeve. The turning door may be disposed within the cavity when the sleeve is disposed in a sleeve stowed position. The turning door may project in a radial outward direction away from the sleeve and the centerline when the sleeve is in a sleeve deployed position.

The thrust reverser system may also include a fixed structure. The cavity may be at least partially formed within the fixed structure.

The sleeve may be abutted against the fixed structure when the sleeve is in the sleeve stowed position. A thrust reverser passage may be opened axially between the sleeve and the fixed structure when the sleeve is in the sleeve deployed position. The turning door may project in the radially outward direction out of the thrust reverser passage when the sleeve is in the sleeve deployed position.

The thrust reverser system may also include a ramp fairing connected to the fixed structure. The cavity may be radially outboard of the ramp fairing.

The cavity may be at least partially formed within the sleeve.

The turning door may be pivotally connected to the sleeve.

The thrust reverser system may also include a blocker door configured to move between a blocker door stowed position and a blocker door deployed position. The blocker door may project in a radially inward direction away from the sleeve and towards the centerline when the sleeve is in the sleeve deployed position.

The blocker door may be pivotally connected to the sleeve.

The thrust reverser system may be configured such that movement of the blocker door actuates movement of the turning door.

The thrust reverser system may also include a linkage. The linkage may be pivotally connected to the turning door and the blocker door.

The assembly may also include an inner fixed structure at least partially forming a radial inner peripheral boundary of a bypass flowpath. The sleeve and the blocker door may at least partially form a radial outer peripheral boundary of the bypass flowpath.

The assembly may also include an inner fixed structure. The thrust reverser system may also include a linkage pivotally connected to the blocker door and the inner fixed structure. The linkage may extend radially across a bypass flowpath when the blocker door is in the blocker door stowed position.

The thrust reverser system may be configured such that: (A) the blocker door translates along the centerline as the sleeve translates along the centerline from the sleeve stowed position to a sleeve intermediate position; and/or (B) the blocker door pivots radially inward as the sleeve translates along the centerline from the sleeve intermediate position to the sleeve deployed position.

The thrust reverser system may be configured such that: (A) the turning door translates along the centerline as the sleeve translates along the centerline from the sleeve stowed position to a sleeve intermediate position; and/or (B) the turning door pivots radially outward as the sleeve translates along the centerline from the sleeve intermediate position to the sleeve deployed position.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
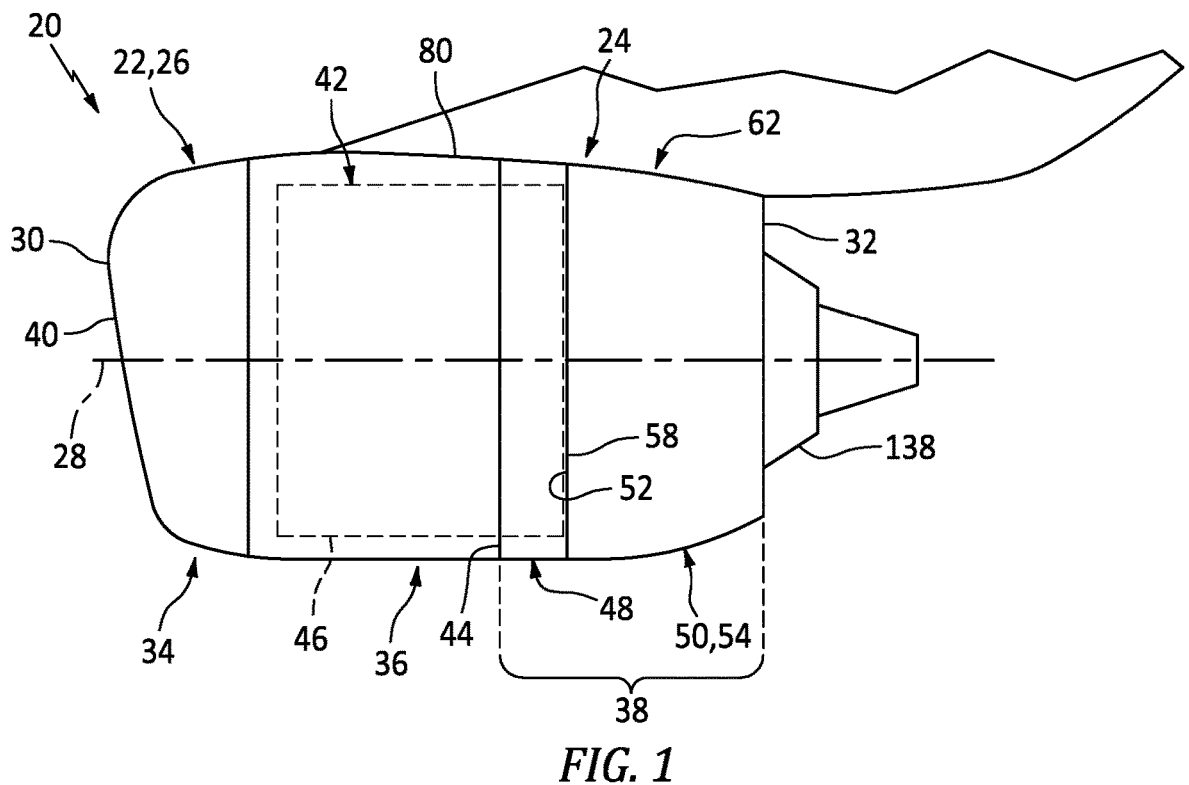
FIG. 1 is a side illustration of an aircraft propulsion system with its thrust reverser system stowed.

FIG. 1 illustrates an aircraft propulsion system 20 for an aircraft such as, but not limited to, a commercial airliner or a cargo plane. The aircraft propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight. The aircraft propulsion system 20 also includes a thrust reverser system 24 configured with the nacelle 22; see also FIGS. 2 to 4.

The nacelle 22 is configured to house and provide an aerodynamic cover for the gas turbine engine. An outer structure 26 of the nacelle 22 extends axially along an axial centerline 28 (e.g., a centerline of the aircraft propulsion system 20, the nacelle 22 and/or the gas turbine engine) between a nacelle forward end 30 and a nacelle aft end 32. The nacelle outer structure 26 of FIG. 1 includes a nacelle inlet structure 34, one or more fan cowls 36 (one such cowl visible in FIG. 1) and a nacelle aft structure 38, which is configured as part of or includes the thrust reverser system 24 (see also FIG. 2).

The inlet structure 34 is disposed at the nacelle forward end 30. The inlet structure 34 is configured to direct a stream of air through an inlet opening 40 at the nacelle forward end 30 and into a fan section 42 of the gas turbine engine.

The fan cowls 36 are disposed axially between the inlet structure 34 and the nacelle aft structure 38. Each fan cowl 36 of FIG. 1, for example, is disposed next to and abutted axially against a forward end 44 of the nacelle aft structure 38. Each of the fan cowls 36 is generally axially aligned with the fan section 42 of the gas turbine engine. The fan cowls 36 are configured to provide an aerodynamic covering for a fan case 46.

The nacelle aft structure 38 includes an outer fixed structure 48 and a translating sleeve 50. The outer fixed structure 48 is disposed at the aft structure forward end 44. The outer fixed structure 48 of FIG. 1, for example, is arranged axially between the fan cowls 36 and the translating sleeve 50.

The translating sleeve 50 is disposed at the nacelle aft end 32. This translating sleeve 50 extends axially along the axial centerline 28 between a forward end 52 of the translating sleeve 50 and the nacelle aft end 32. The translating sleeve 50 of FIG. 1 includes a pair of sleeve segments 54 (e.g., halves) arranged on opposing sides of the aircraft propulsion system 20 (one such sleeve segment 54 visible in FIG. 1). The present disclosure, however, is not limited to such an exemplary translating sleeve configuration. For example, the translating sleeve 50 may alternatively have a substantially tubular body. For example, the translating sleeve 50 may extend more than three-hundred and thirty degrees (330°) around the axial centerline 28.

Figure 2:
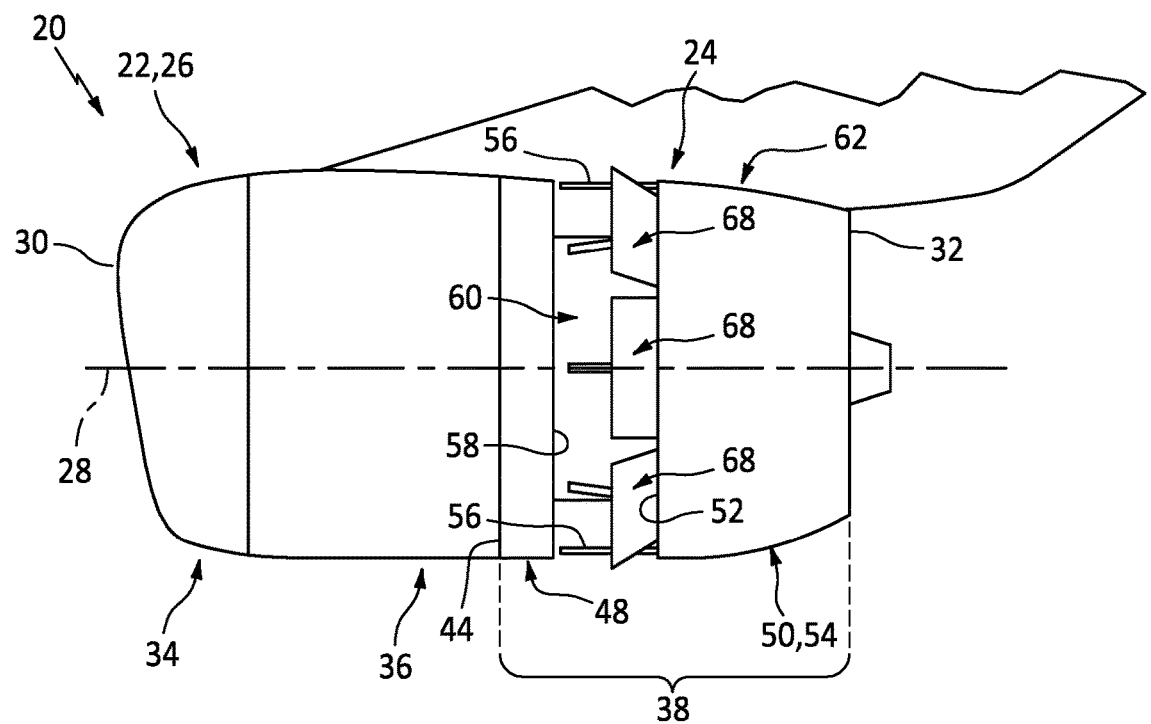
FIG. 2 is a side illustration of the aircraft propulsion system with its thrust reverser system deployed.

Referring to FIGS. 1 and 2, the translating sleeve 50 is an axially translatable structure. Each translating sleeve segment 54, for example, may be slidably connected to one or more stationary structures (e.g., a pylon and a lower bifurcation) through one or more respective track assemblies 56. Each track assembly 56 may include a rail mated with a track beam; however, the present disclosure is not limited to the foregoing exemplary sliding connection configuration. The translating sleeve 50 and its sleeve segments 54 are thereby configured to translate axially along the axial centerline 28 between a forward, stowed position (see FIG. 1) and an aft, deployed position (see FIG. 2). In the sleeve stowed position of FIG. 1, the sleeve forward end 52 is disposed axially next to and abutted axially against an aft end 58 of the outer fixed structure 48. In the sleeve deployed position of FIG. 2, the sleeve forward end 52 is spaced/separated from the outer fixed structure aft end 58 by an axial distance. The translating sleeve 50 and its sleeve segments 54 may thereby open up/uncover a flow passage 60 through the thrust reverser system 24.

Figure 3:
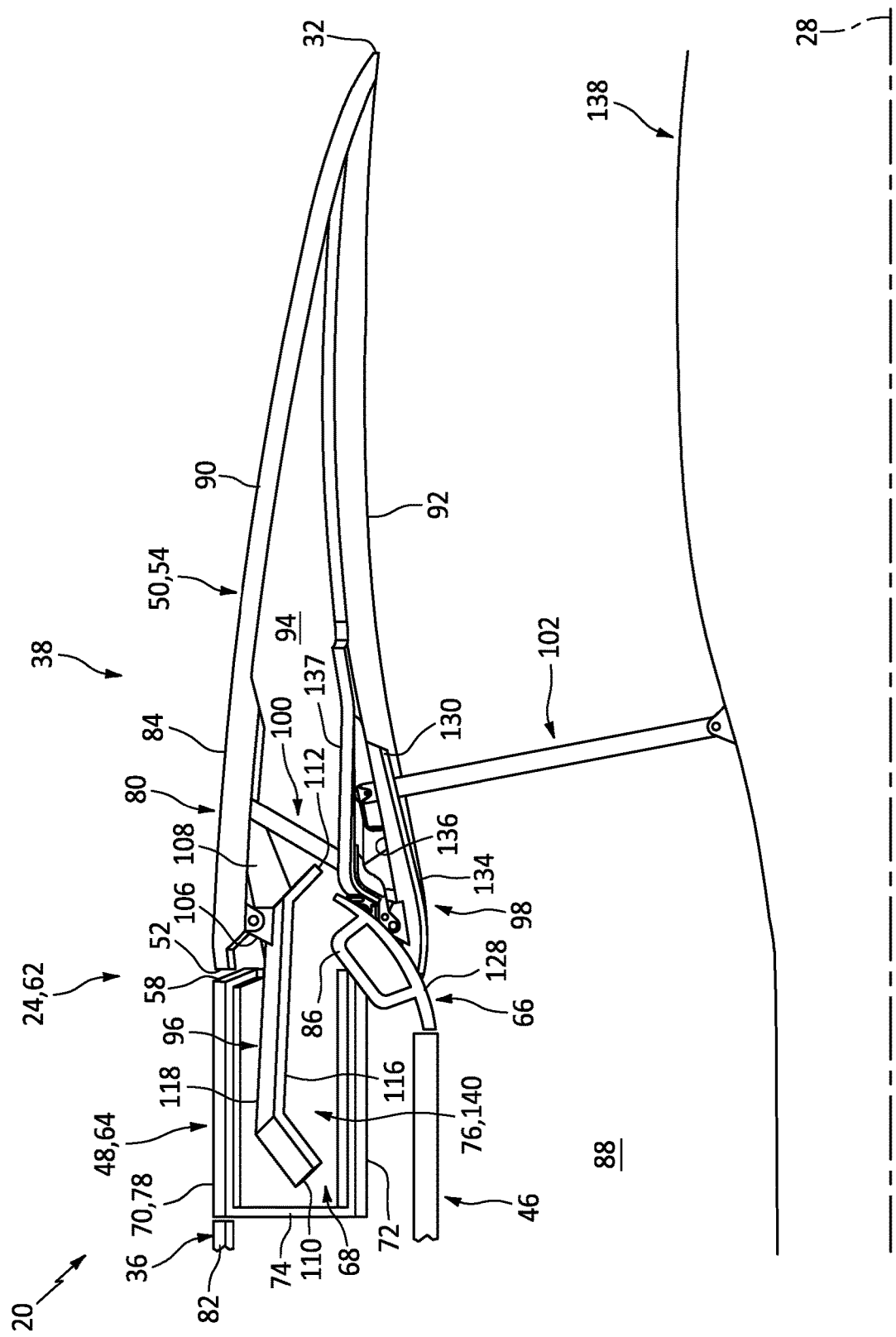
FIG. 3 is a partial sectional illustration of the aircraft propulsion system with its thrust reverser system stowed.

The thrust reverser system 24 of FIGS. 1 and 2 may include one or more sections 62 (one such thrust reverser sections 62 visible in FIG. 1), where the thrust reverser sections 62 may be disposed on opposing sides of the aircraft propulsion system 20. Referring to FIG. 3, the thrust reverser system 24 and each of its thrust reverser sections 62 may include a segment 64 of the outer fixed structure 48, a fan ramp fairing 66 (also sometimes referred to as a bullnose ramp) and a segment of the translating sleeve 50 (e.g., one of the sleeve segments 54). The thrust reverser system 24 and each of its thrust reverser sections 62 also includes one or more door assemblies 68; see also FIG. 2.

The outer fixed structure 48 and its segment 64 of FIG. 3 are configured as a support structure (e.g., a torque box) for the thrust reverser system 24. The outer fixed structure 48 and its segment 64 of FIG. 3 have a channeled (e.g., U-shaped or C-shaped) sectional geometry, which channel sectional geometry extends circumferentially about the axial centerline 28. The outer fixed structure 48 and its segment 64 of FIG. 3, for example, include a structure outer wall 70, a structure inner wall 72 and a structure bulkhead wall 74. These outer fixed structure members 70, 72 and 74 may collectively form an internal channel 76 within the outer fixed structure 48 and its segment 64.

The structure outer wall 70 may partially form an external peripheral boundary of the aircraft propulsion system 20 and its nacelle 22. The structure outer wall 70 of FIG. 3, for example, forms a segment 78 of an exterior aerodynamic flow surface 80 of the nacelle 22. This flow surface segment 78 may be flush with exterior surface segments 82 and 84 of a respective fan cowl 36 and the translating sleeve 50 and a respective one of its sleeve segments 54.

The structure inner wall 72 is disposed radially within the structure outer wall 70. The structure inner wall 72 is disposed radially outboard of and axially overlaps the fan case 46.

The structure bulkhead wall 74 may be disposed at a forward end of the outer fixed structure 48. The structure bulkhead wall 74 extends radially between and is connected to the structure outer wall 70 and the structure inner wall 72.

The structure channel 76 extends axially along the axial centerline 28 (e.g., partially) into the outer fixed structure 48 and its segment 64 from the structure aft end 58 to the structure bulkhead wall 74. The structure channel 76 extends radially within the outer fixed structure 48 and its segment 64 between and to the structure outer wall 70 and the structure inner wall 72. The structure channel 76 extends circumferentially within (or into or through) the outer fixed structure 48 and its segment 64 circumferentially about the axial centerline 28.

Figure 4:
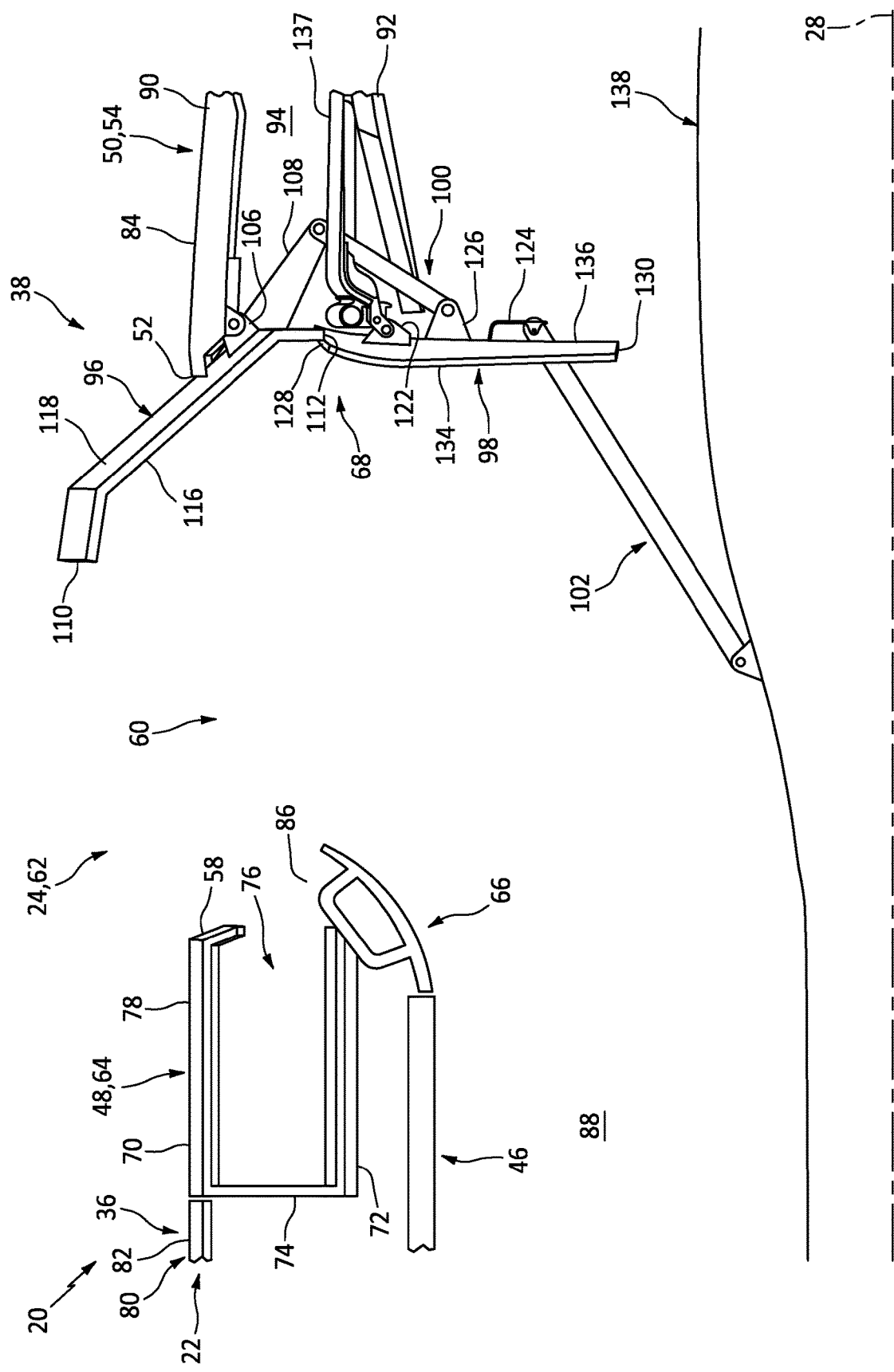
FIG. 4 is a partial sectional illustration of the aircraft propulsion system with its thrust reverser system deployed.

The ramp fairing 66 is connected to the structure inner wall 72, for example, through a frame 86. The ramp fairing 66 is located at (e.g., on, adjacent or proximate) the structure aft end 58. Referring to FIG. 4, the ramp fairing 66 is configured to provide a (e.g., smooth and/or aerodynamic) transition from a forward portion of a bypass flowpath 88 to the respective thrust reverser flow passage 60 when the thrust reverser system 24 is in its deployed configuration.

The translating sleeve 50 and its sleeve segment 54 of FIG. 3 includes a sleeve outer panel 90 and a sleeve inner panel 92. The sleeve outer panel 90 is disposed radially outboard of the sleeve inner panel 92. The sleeve outer panel 90 circumferentially and axially overlaps the sleeve inner panel 92. The sleeve outer panel 90 is radially spaced (e.g., separated) from the sleeve inner panel 92 at the sleeve forward end 52. The sleeve outer panel 90, however, may meet and/or be connected to the sleeve inner panel 92 at or about the nacelle aft end 32. The sleeve outer panel 90 and the sleeve inner panel 92 may thereby form an internal channel 94 within the translating sleeve 50 and its sleeve segment 54.

The sleeve channel 94 extends axially along the axial centerline 28 (e.g., partially) into the translating sleeve 50 and its sleeve segment 54 from the sleeve forward end 52 to a connection (e.g., an interface, a joint, etc.) between the sleeve outer panel 90 and the sleeve inner panel 92. The sleeve channel 94 extends radially within the translating sleeve 50 and its sleeve segment 54 between and to the sleeve inner panel 92 and the sleeve outer panel 90. The sleeve channel 94 extends circumferentially within (or into or through) the translating sleeve 50 and its sleeve segment 54 circumferentially about the axial centerline 28.

Referring to FIG. 2, the door assemblies 68 are distributed circumferentially about the axial centerline 28 in, for example, an arcuate or generally annular array. Referring to FIGS. 3 and 4, each of the door assemblies 68 includes a thrust reverser (TR) turning door 96, a thrust reverser (TR) blocker door 98, a turning door actuation linkage 100 (e.g., an inter-door linkage) and a blocker door actuation linkage 102 (e.g., a drag linkage).

Figure 5:
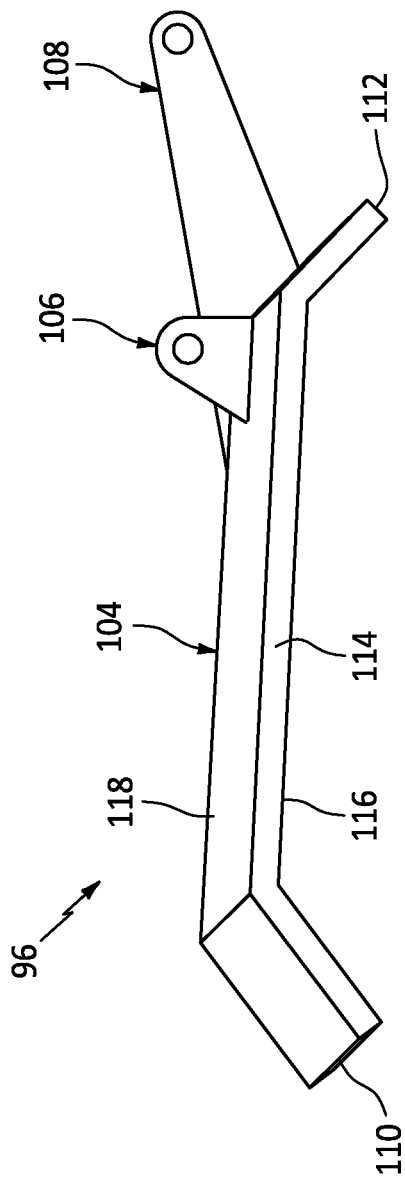
FIG. 5 is a perspective illustration of a turning door.

Referring to FIG. 5, the TR turning door 96 includes a turning door panel 104, one or more turning door pivot mounts 106 (one such mount visible in FIG. 5) and at least one turning door linkage mount 108. The turning door panel 104 extends longitudinally (e.g., axially along the axial centerline 28 when the TR turning door 96 is stowed; e.g., see FIG. 3) between and to a first end 110 of the turning door panel 104 and a second end 112 of the turning door panel 104. This turning door first end 110 may be an axially forward end of the turning door panel 104 when the TR turning door 96 is in a stowed position (e.g., see FIG. 3) and/or a deployed position (e.g., see FIG. 4). The turning door first end 110 may also be a radial outer end of the turning door panel 104 when the TR turning door 96 is in the turning door deployed position (e.g., see FIG. 4). By contrast, the turning door second end 112 may be an axially aft end of the turning door panel 104 when the TR turning door 96 is in the turning door stowed position (e.g., see FIG. 3) and/or the turning door deployed position (e.g., see FIG. 4). The turning door second end 112 may also be a radial inner end of the turning door panel 104 when the TR turning door 96 is in the turning door deployed position (e.g., see FIG. 4).

The turning door panel 104 extends laterally (e.g., circumferentially or tangentially) between and to opposing sides 114 of the TR turning door 96. The turning door panel 104 extends vertically (e.g., radially when the TR turning door 96 is stowed; e.g., see FIG. 3) between and to a front side 116 of the turning door panel 104 and a back side 118 of the turning door panel 104. The turning door front side 116 may be a radial inner side of the turning door panel 104 when the TR turning door 96 is in the turning door stowed position (e.g., see FIG. 3), and the turning door front side 116 may be an axially forward side of the turning door panel 104 when the TR turning door 96 is in the turning door deployed position (e.g., see FIG. 4). By contrast, the turning door back side 118 may be a radial outer side of the turning door panel 104 when the TR turning door 96 is in the turning door stowed position (e.g., see FIG. 3), and the turning door back side 118 may be an axially aft side of the turning door panel 104 when the TR turning door 96 is in the turning door deployed position (e.g., see FIG. 4).

Each of the turning door pivot mounts 106 is connected (e.g., fixedly secured) to the turning door panel 104 at its turning door back side 118. Each of the turning door pivot mounts 106 projects out from the turning door panel 104 and its turning door back side 118 to a distal end of the respective turning door pivot mount 106. Each of the turning door pivot mounts 106 of FIG. 5 is configured as a mounting tab.

The turning door linkage mount 108 is fixedly connected (e.g., fixedly secured) to the turning door panel 104 at its turning door back side 118. The turning door linkage mount 108 projects out from the turning door panel 104 and its turning door back side 118 to a distal end of the turning door linkage mount 108. The turning door linkage mount 108 of FIG. 5 is configured as a lever arm.

Referring to FIG. 4, the TR turning door 96 is movably coupled to the translating sleeve 50 and its sleeve segment 54. The turning door pivot mounts 106 of FIG. 4, for example, are pivotally connected to sleeve outer mounts (e.g., tabs) via pin connections, where each of the sleeve outer mounts is connected to the sleeve outer panel 90 within the sleeve channel 94. The TR turning door 96 may thereby be pivotally connected (e.g., hinged) to the sleeve outer panel 90.

Figure 6:
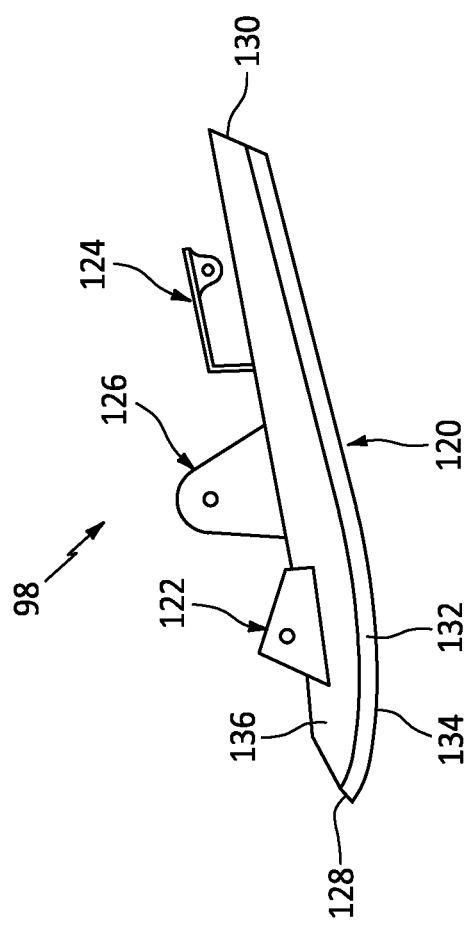
FIG. 6 is a perspective illustration of a blocker door.
Figure 7A:
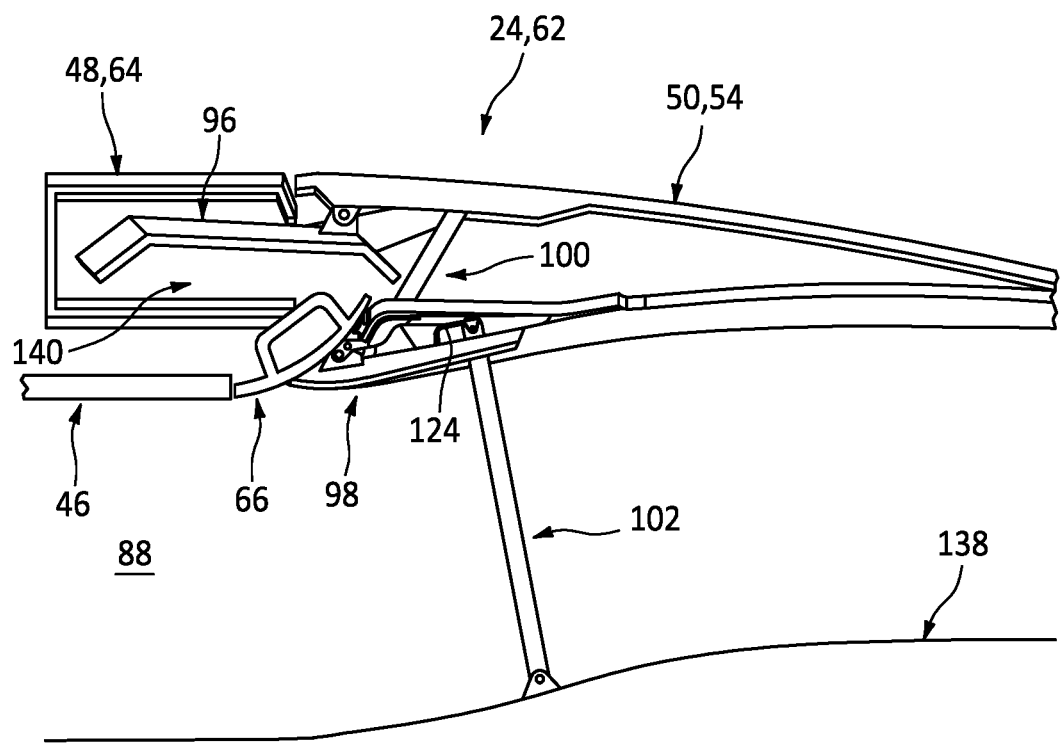
FIGS. 7A-E are a sequence of partial sectional illustrations depicting the thrust reverser system being deployed.
Figure 7B:
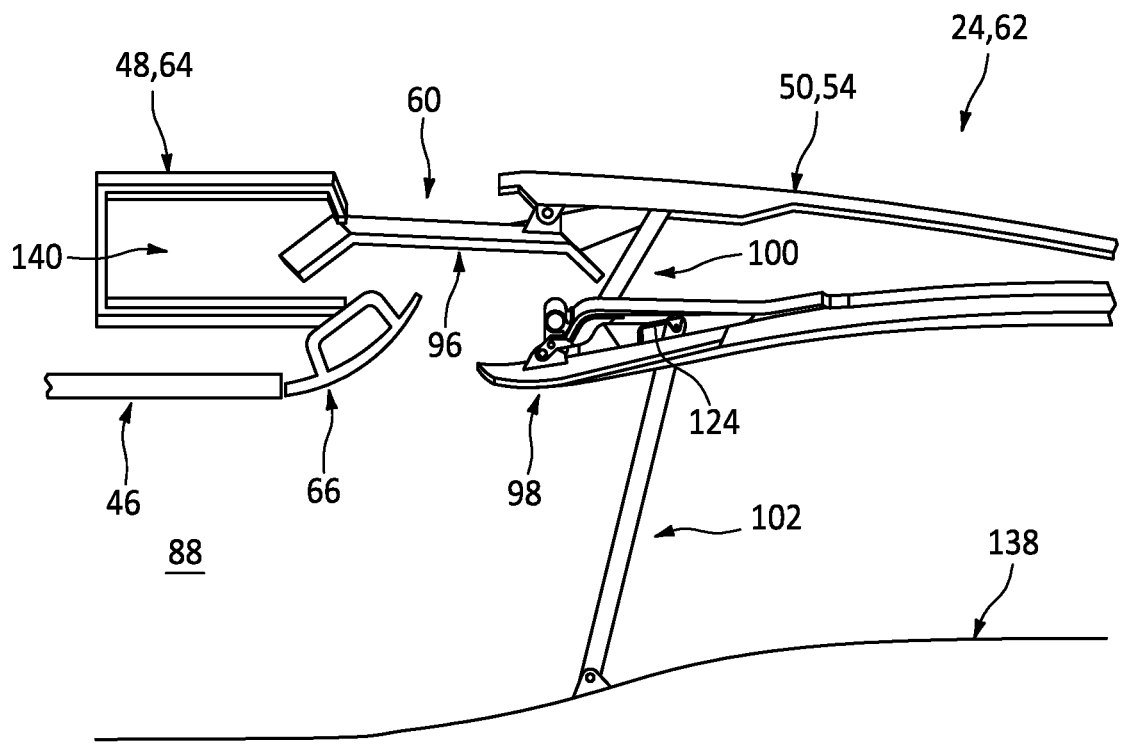
Figure 7C:
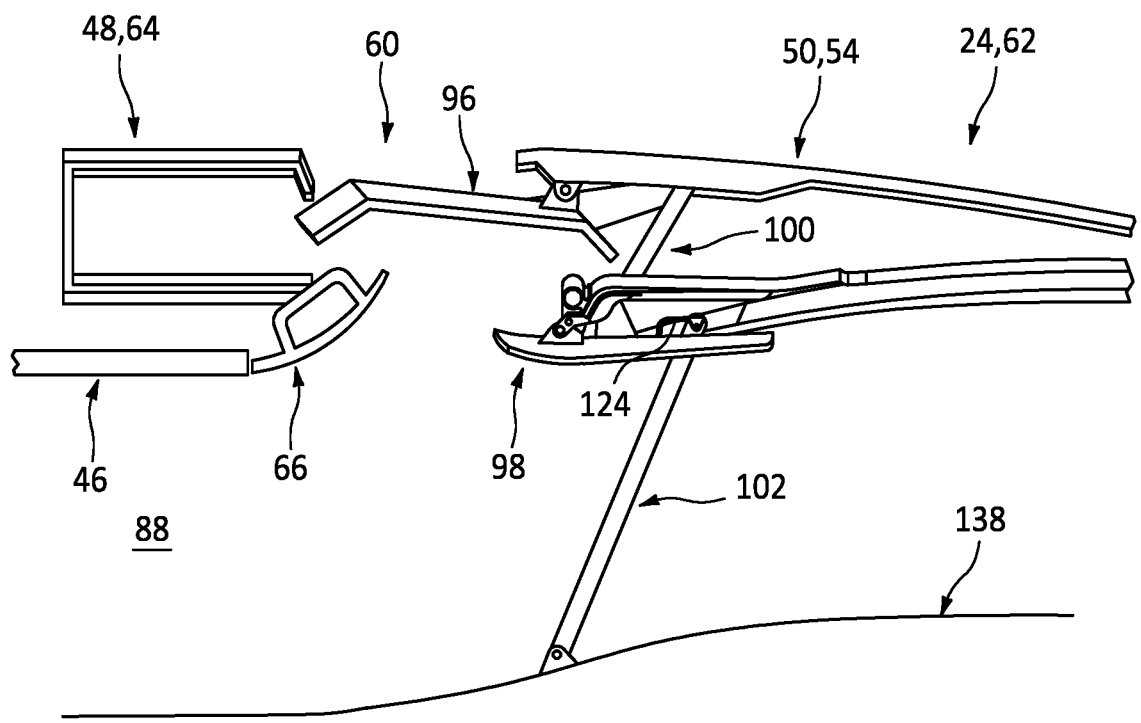
Figure 7D:
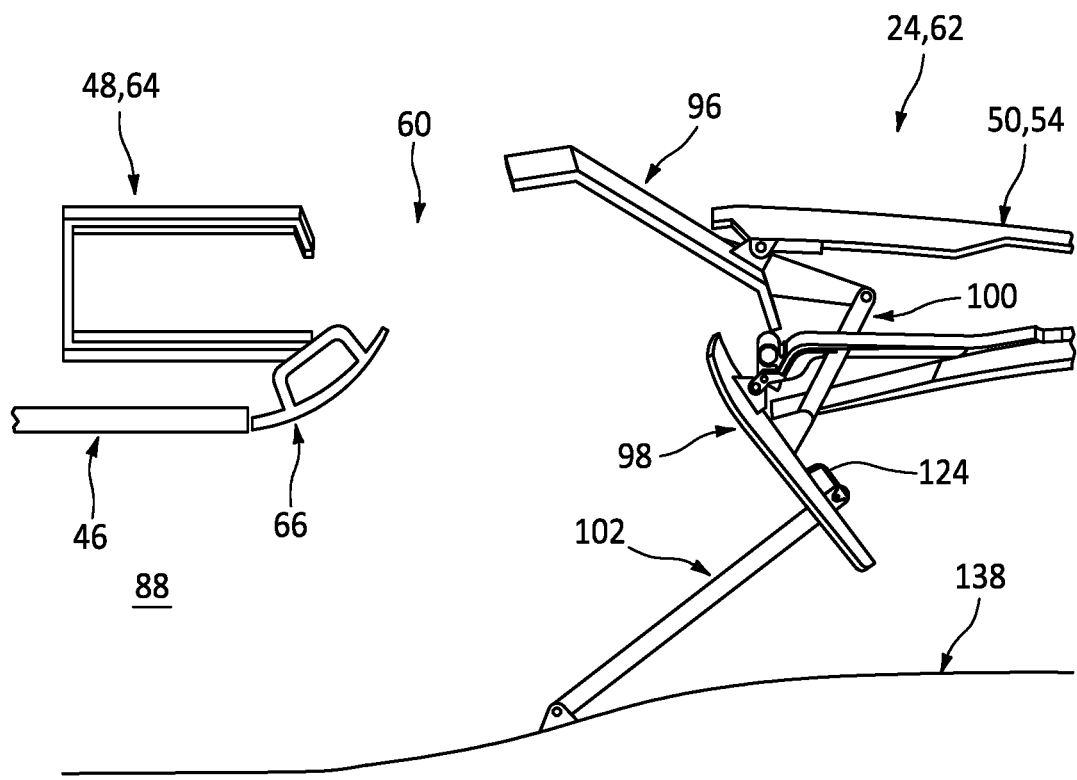
Figure 7E:
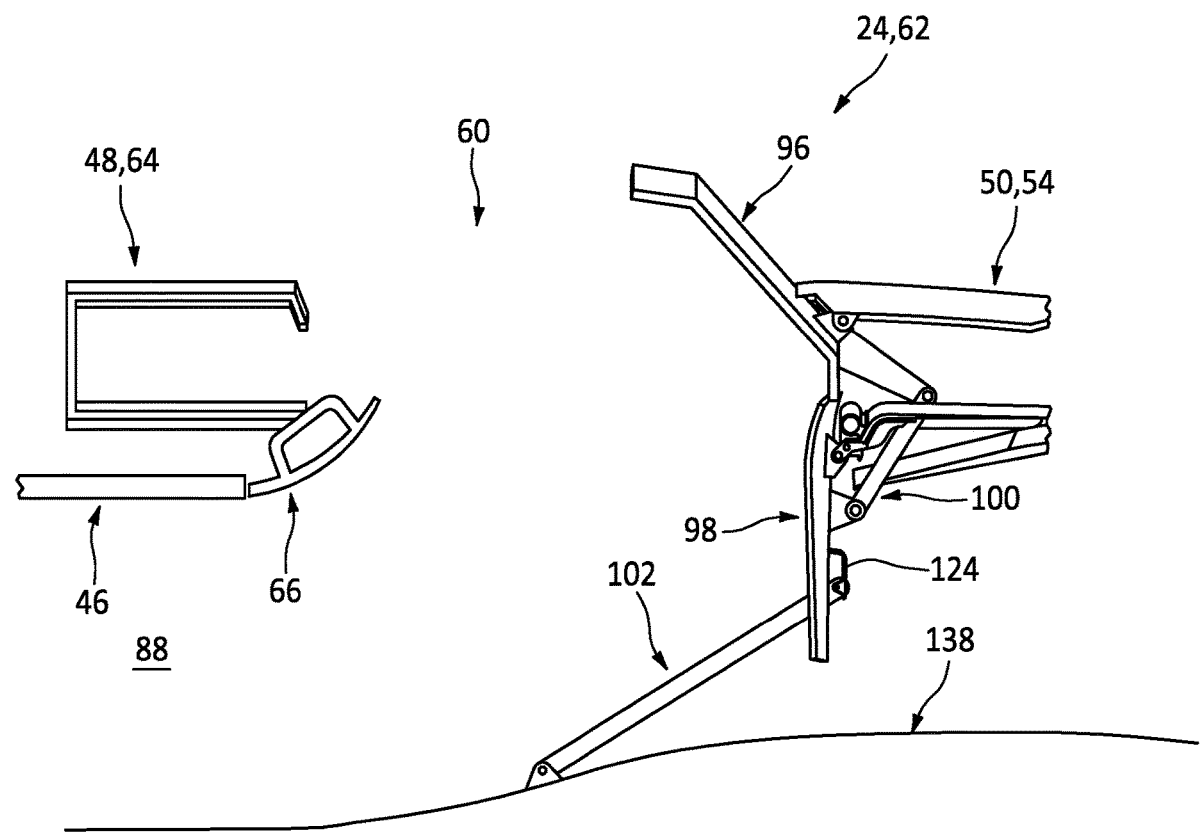

Referring to FIG. 6, the TR blocker door 98 includes a blocker door panel 120, one or more blocker door pivot mounts 122 (one such mount visible in FIG. 6) and one or more blocker door linkage mounts 124 and 126. The blocker door panel 120 extends longitudinally (e.g., axially along the axial centerline 28 when the TR blocker door 98 is stowed; e.g., see FIG. 3) between and to a first end 128 of the blocker door panel 120 and a second end 130 of the blocker door panel 120. This blocker door first end 128 may be an axially forward end of the blocker door panel 120 when the TR blocker door 98 is in a stowed position (e.g., see FIG. 3). The blocker door first end 128 may also be a radial inner end of the blocker door panel 120 when the TR blocker door 98 is in the blocker door stowed position (e.g., see FIG. 3), and the blocker door first end 128 may be a radial outer end of the blocker door panel 120 when the TR blocker door 98 is in the blocker door deployed position (e.g., see FIG. 4). By contrast, the blocker door second end 130 may be an axially aft end of the blocker door panel 120 when the TR blocker door 98 is in the blocker door stowed position (e.g., see FIG. 3). The blocker door second end 130 may also be a radial outer end of the blocker door panel 120 when the TR blocker door 98 is in the blocker door stowed position (e.g., see FIG. 3), and the blocker door second end 130 may be a radial inner end of the blocker door panel 120 when the TR blocker door 98 is in the blocker door deployed position (e.g., see FIG. 4).

The blocker door panel 120 extends laterally (e.g., circumferentially or tangentially) between and to opposing sides 132 of the TR blocker door 98. The blocker door panel 120 extends vertically (e.g., radially when the TR blocker door 98 is stowed; e.g., see FIG. 3) between and to a front side 134 of the blocker door panel 120 and a back side 136 of the blocker door panel 120. The blocker door front side 134 may be a radial inner side of the blocker door panel 120 when the TR blocker door 98 is in the blocker door stowed position (e.g., see FIG. 3), and the blocker door front side 134 may be an axially forward side of the blocker door panel 120 when the TR blocker door 98 is in the turning door deployed position (e.g., see FIG. 4). By contrast, the blocker door back side 136 may be a radial outer side of the blocker door panel 120 when the TR blocker door 98 is in the blocker door stowed position (e.g., see FIG. 3), and the blocker door back side 136 may be an axially aft side of the blocker door panel 120 when the TR blocker door 98 is in the blocker door deployed position (e.g., see FIG. 4).

Each of the blocker door pivot mounts 122 is connected (e.g., fixedly secured) to the blocker door panel 120 at its blocker door back side 136. Each of the blocker door pivot mounts 122 projects out from the blocker door panel 120 and its blocker door back side 136 to a distal end of the respective blocker door pivot mount 122. Each of the blocker door pivot mounts 122 of FIG. 6 is configured as a mounting tab.

Each blocker door linkage mount 124, 126 is fixedly connected (e.g., fixedly secured) to the blocker door panel 120 at its blocker door back side 136. Each blocker door linkage mount 124, 126 projects out from the blocker door panel 120 and its blocker door back side 136. The blocker door linkage mount 124 may be configured as a lost motion device. The blocker door linkage mount 124 of FIG. 6, for example, is configured as a spring arm; e.g., L-shaped or a C-shaped leaf spring. The blocker door linkage mount 126 of FIG. 6 is configured as a lever arm and/or a mounting tab.

Referring to FIG. 4, the TR blocker door 98 is movably coupled to the translating sleeve 50 and its sleeve segment 54. The blocker door pivot mounts 122 of FIG. 4, for example, are pivotally connected to at least one sleeve inner mount 137 (e.g., a frame) via pin connections, where the sleeve inner mount 137 is connected to the sleeve inner panel 92 within the sleeve channel 94. The TR blocker door 98 may thereby be pivotally connected (e.g., hinged) to the sleeve inner panel 92.

The turning door actuation linkage 100 of FIG. 4 is configured as a (e.g., fixed length) strut; e.g., a link, an arm, etc. The turning door actuation linkage 100 extends longitudinally between and to a first end of the turning door actuation linkage 100 and a second end of the turning door actuation linkage 100. The turning door actuation linkage 100 is movably coupled to the turning door linkage mount 108 at the first end. The turning door actuation linkage 100 of FIG. 4, for example, is pivotally connected to the turning door linkage mount 108 via a pin connection. The turning door actuation linkage 100 is also movably coupled to the blocker door linkage mount 126 at the second end. The turning door actuation linkage 100 of FIG. 4, for example, is pivotally connected to the blocker door linkage mount 126 via a pin connection.

The blocker door actuation linkage 102 of FIG. 4 is configured as a (e.g., fixed length) strut; e.g., a link, an arm, etc. The blocker door actuation linkage 102 extends longitudinally between and to a first end of the blocker door actuation linkage 102 and a second end of the blocker door actuation linkage 102. The blocker door actuation linkage 102 is movably coupled to the blocker door linkage mount 124 at the first end. The blocker door actuation linkage 102 of FIG. 4, for example, is pivotally connected to the blocker door linkage mount 124 via a pin connection. The blocker door actuation linkage 102 is also movably coupled to a linkage mount at the second end, where the linkage mount is connected to an inner structure 138 of the nacelle 22 (also sometimes referred to as an inner fixed structure (IFS)). The blocker door actuation linkage 102 of FIG. 4, for example, is pivotally connected to the nacelle inner structure 138 mount via a pin connection.

Briefly, the nacelle inner structure 138 is configured to house and provide an aerodynamic cover for a core of the gas turbine engine, which engine core typically include a compressor section, a combustor section and a turbine section of the gas turbine engine. The nacelle inner structure 138 of FIGS. 3 and 4 is also configured to at least partially (or completely) form an inner peripheral boundary of the bypass flowpath 88.

Referring to FIG. 3, when the thrust reverser system 24 and each of its elements 96 and 98 are (e.g., fully, completely) stowed, each TR turning door 96 is arranged within an internal cavity 140 of the thrust reverser system 24. A forward portion of this cavity 140 is formed by the structure channel 76. An aft portion of the cavity 140 is formed by the sleeve channel 94. Each TR turning door 96 may thereby be hidden (e.g., covered) from an exterior of the aircraft propulsion system 20 as well as the bypass flowpath 88 within the thrust reverser system 24 and its elements 48, 50, 54 and 64. More particularly, a forward portion of the TR turning door 96 is located radially between, overlapped by and thereby covered by the structure outer wall 70 and the structure inner wall 72. An aft portion of the TR turning door 96 is located radially between, overlapped by and thereby covered by the sleeve outer panel 90 and the sleeve inner panel 92. The turning door actuation linkage 100 is also located and hidden within the cavity 140 and, more particularly, the sleeve channel 94. The TR turning door 96 and the turning door actuation linkage 100 may thereby, for example, create no flow disturbance outside of the aircraft propulsion system 20 and/or within the bypass flowpath 88 when stowed.

Each stowed TR blocker door 98 may be received (e.g., nested) within a pocket in the translating sleeve 50 and its sleeve segment 54. Each TR blocker door 98 of FIG. 3 is thereby flush with the sleeve inner panel 92. With this arrangement, the TR blocker doors 98 and the sleeve inner panel 92 may form an aft portion of the outer peripheral boundary of the bypass flowpath 88. Each TR blocker door 98 may thereby have a reduced impact on flow through the bypass flowpath 88 when stowed. The blocker door actuation linkage 102 may extend radially across the bypass flowpath 88 from the TR blocker door 98 to the nacelle inner structure 138.

Referring to FIG. 4, when the thrust reverser system 24 and each of its elements 96 and 98 are (e.g., fully, completely) deployed, each TR turning door 96 is moved (e.g., pivoted) to its deployed position. In this deployed position, each TR turning door 96 projects in a radial outward direction away from the translating sleeve 50 and its sleeve segment 54 and away from the axial centerline 28. More particularly, each TR turning door 96 projects out from the sleeve channel 94, through the thrust reverser flow passage 60 and out and away the rest of the nacelle 22 to its turning door first end 110. Similarly, each TR blocker door 98 is moved (e.g., pivoted) to its deployed position. In this deployed position, each TR blocker door 98 projects in a radial inner direction away from the translating sleeve 50 and its sleeve segment 54 and towards the axial centerline 28. More particularly, each TR blocker door 98 projects out of the thrust reverser flow passage 60 and into the bypass flowpath 88 to its blocker door second end 130. With this arrangement, each TR blocker door 98 and the respective TR turning door 96 collectively form a turning vane. Each TR blocker door 98, for example, may redirect bypass gas flowing aft within the bypass flowpath 88 radially outward into the thrust reverser flow passage 60. The TR turning door 96 may turn the redirected bypass gas exiting the thrust reverser flow passage 60 in an axially forward direction. The thrust reverser system 24 may thereby be configured as a cascade-less thrust reverser system; e.g., a thrust reverser system configured without a thrust reverser cascade. This may eliminate costs and design complexities associated with including one or more thrust reverser cascades.

FIGS. 7A-E illustrate a sequence of the thrust reverser system 24 and its element 96 and 98 being deployed. More particularly, FIGS. 7A-E illustrate movement of the thrust reverser system elements 96 and 98 each moving from its stowed position to its deployed position. As illustrated by the movement from FIGS. 7A to 7B, each TR turning door 96 and the respective TR blocker door 98 may (e.g., only) axially translate along the axial centerline 28 as the translating sleeve 50 moves from its stowed position of FIG. 7A to an intermediate position of FIG. 7B. However, as the translating sleeve 50 moves from the intermediate position of FIG. 7B to its deployed position of FIG. 7E, each TR turning door 96 and the respective TR blocker door 98 pivot to their deployed positions. This delayed pivoting of the TR turning door 96 and the TR blocker door 98 may be facilitated through the connection between the blocker door actuation linkage 102 and the TR blocker door 98. For example, each mount 124 may flex as the translating sleeve 50 moves from the stowed position of FIG. 7A to the intermediate position of FIG. 7B. This flexure facilitates a slight movement between the blocker door actuation linkage 102 and the respective TR blocker door 98. Since the first end of the blocker door actuation linkage 102 moves radially outward as the translating sleeve 50 moves from the stowed position of FIG. 7A to the intermediate position of FIG. 7B, the TR blocker door 98 is maintained in its horizontal position. However, as the translating sleeve 50 begins to move from the intermediate position of FIG. 7B to the deployed position of FIG. 7E, the blocker door actuation linkage 102 begins to pull on the respective TR blocker door 98 thereby pivoting that TR blocker door 98 radially inwards. The turning door actuation linkage 100 translates this movement of the respective TR blocker door 98 into movement (e.g., pivoting) of the respective TR turning door 96.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   an inner fixed structure;
   a thrust reverser system comprising a cavity, a sleeve, a turning door, a blocker door, a linkage and a second fixed structure;
   the sleeve configured to translate along a centerline between a sleeve stowed position and a sleeve deployed position;
   the turning door configured to move between a turning door stowed position and a turning door deployed position, the turning door disposed within the cavity when the sleeve is disposed in the sleeve stowed position, and the turning door projecting in a radial outward direction away from the sleeve and the centerline when the sleeve is in the sleeve deployed position,
   the blocker door configured to move between a blocker door stowed position and a blocker door deployed position, and the blocker door projecting in a radially inward direction away from the sleeve and towards the centerline when the sleeve is in the sleeve deployed position;
   the linkage pivotally connected to the blocker door and the inner fixed structure, and the linkage extending radially across a bypass flowpath when the blocker door is in the blocker door stowed position; and
   the cavity formed at least partially within the second fixed structure.

2. The assembly of claim 1, wherein the sleeve is abutted against the second fixed structure when the sleeve is in the sleeve stowed position; a thrust reverser passage is opened axially between the sleeve and the second fixed structure when the sleeve is in the sleeve deployed position; and the turning door projects in the radially outward direction out of the thrust reverser passage when the sleeve is in the sleeve deployed position.

3. The assembly of claim 1, wherein the thrust reverser system further comprises a ramp fairing connected to the second fixed structure; and the cavity is radially outboard of the ramp fairing.

4. The assembly of claim 1, wherein the cavity is at least partially formed within the sleeve.

5. The assembly of claim 1, wherein the turning door is pivotally connected to the sleeve.

6. The assembly of claim 1, wherein the blocker door is pivotally connected to the sleeve.

7. The assembly of claim 1, wherein the thrust reverser system is configured such that movement of the blocker door actuates movement of the turning door.

8. The assembly of claim 1, wherein
the thrust reverser system further comprises a second linkage; and
the second linkage is pivotally connected to the turning door and the blocker door.

9. The assembly of claim 1, wherein the thrust reverser system is configured such that
the blocker door translates along the centerline as the sleeve translates along the centerline from the sleeve stowed position to a sleeve intermediate position; and
the blocker door pivots radially inward as the sleeve translates along the centerline from the sleeve intermediate position to the sleeve deployed position.

10. The assembly of claim 1, wherein the thrust reverser system is configured such that
the turning door translates along the centerline as the sleeve translates along the centerline from the sleeve stowed position to a sleeve intermediate position; and
the turning door pivots radially outward as the sleeve translates along the centerline from the sleeve intermediate position to the sleeve deployed position.

11. An assembly for an aircraft propulsion system, comprising:
an inner fixed structure at least partially forming a radial inner peripheral boundary of a bypass flowpath; and
a thrust reverser system comprising a cavity, a sleeve, a turning door, a blocker door and a second fixed structure;
the sleeve configured to translate along a centerline between a sleeve stowed position and a sleeve deployed position;
the turning door configured to move between a turning door stowed position and a turning door deployed position, the turning door disposed within the cavity when the sleeve is disposed in the sleeve stowed position, and the turning door projecting in a radial outward direction away from the sleeve and the centerline when the sleeve is in the sleeve deployed position;
the blocker door configured to move between a blocker door stowed position and a blocker door deployed position, and the blocker door projecting in a radially inward direction away from the sleeve and towards the centerline when the sleeve is in the sleeve deployed position;
the sleeve and the blocker door at least partially forming a radial outer peripheral boundary of the bypass flowpath when the sleeve is disposed in the sleeve stowed position; and
the cavity formed at least partially within the second fixed structure.

12. An assembly for an aircraft propulsion system, comprising:
a thrust reverser system comprising a turning door, a blocker door, a linkage and a translating sleeve;
the turning door configured to pivot radially outward away from a centerline from a turning door stowed position to a turning door deployed position, and the turning door including a turning door panel and a turning door mount that is radially outboard of the turning door panel when the turning door is in the turning door stowed position;
the blocker door configured to pivot radially inward towards the centerline from a blocker door stowed position to a blocker door deployed position, and the blocker door including a blocker door panel and a blocker door mount that is radially outboard of the blocker door panel when the blocker door is in the blocker door stowed position;
the linkage comprising a strut that extends longitudinally from a first end of the strut to a second end of the strut, the strut pivotally connected to the turning door mount at the first end by a first pin connection between the strut and the turning door mount, and the strut pivotally connected to the blocker door mount at the second end by a second pin connection between the strut and the blocker door mount; and
the turning door and the blocker door are movably coupled to the translating sleeve.

13. The assembly of claim 12, wherein the thrust reverser system further comprises a cavity;
the turning door is disposed within the cavity when the translating sleeve is disposed in a sleeve stowed position; and
the turning door projects in a radial outward direction away from the sleeve and the centerline when the translating sleeve is in a sleeve deployed position.

14. An assembly for an aircraft propulsion system, comprising:
an inner fixed structure at least partially forming an inner peripheral boundary of a bypass flowpath within the aircraft propulsion system; and
a thrust reverser system comprising a sleeve, a turning door, a blocker door, a first linkage, a second linkage and a second fixed structure;
the turning door stowed when the sleeve is in a sleeve stowed position, and the turning door deployed and projecting in a radial outward direction away from the sleeve and a centerline when the sleeve is in a sleeve deployed position;
the blocker door stowed when the sleeve is in the sleeve stowed position, the blocker door and the sleeve at least partially forming an outer peripheral boundary of the bypass flowpath when the sleeve is in the sleeve stowed position, and the blocker door deployed and projecting in a radial inward direction away from the sleeve and towards the centerline when the sleeve is in the sleeve deployed position;
the first linkage pivotally connected to the turning door and the blocker door;
the second linkage pivotally connected to the blocker door and the inner fixed structure; and
the cavity formed at least partially within the second fixed structure.

* * * * *